INVENTOR.
Peter W. Fassler
BY Everett H. Wright
ATTORNEY.

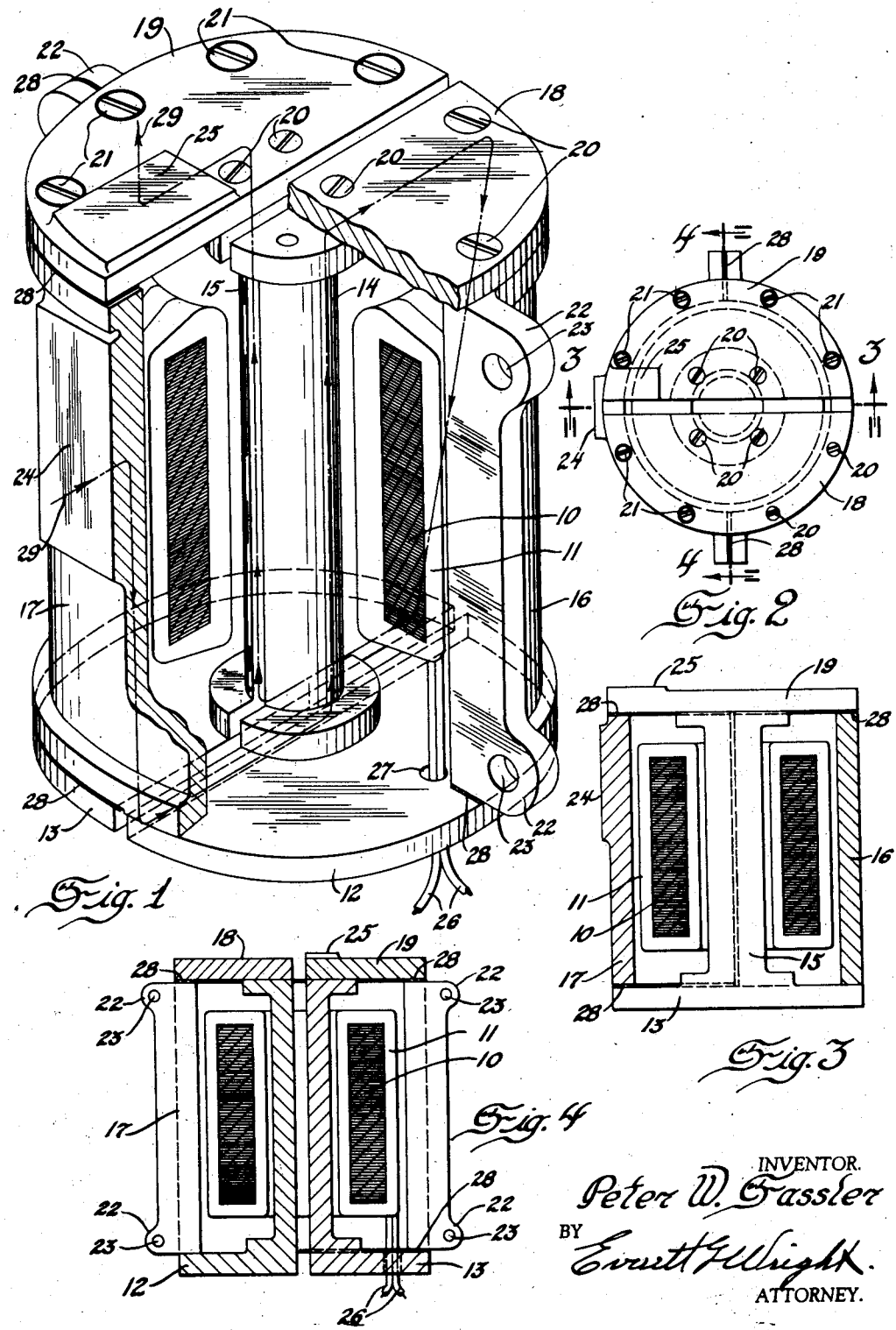

Patented Jan. 8, 1935

1,986,884

UNITED STATES PATENT OFFICE 1,986,884

WELDING TRANSFORMER

Peter W. Fassler, Detroit, Mich.

Application October 11, 1934, Serial No. 747,912

9 Claims. (Cl. 175—361)

This invention relates to welding transformers of the core type having a plurality of turns in the secondary winding and in particular to transformers in which the housing performs the additional function of being the secondary winding.

Welding transformers in which a single turn secondary winding is accomplished by constructing the housing of the said transformer to serve as a single turn secondary winding are well known in the art. This invention permits the use of the housing of a transformer for providing a two or more turn secondary winding. A distinct advantage is obtained by using a two or more turn secondary winding since the size and weight of the iron transformer core may be materially decreased thereby.

The main object of this invention is to provide a welding transformer in which the housing thereof serves as a two or more turn secondary winding.

Another object of this invention is to provide a welding transformer having a multiple turn secondary in which the necessity for enclosing the said transformer in its usual cast iron housing is eliminated thereby avoiding the usual induction losses caused by cast iron transformer housings.

Another object of this invention is to provide a welding transformer having a transformer housing that serves as a multiple turn secondary winding which reduces the size and weight of iron core required.

Still another object of this invention is to provide a light weight welding transformer in which the housing serves as a multiple turn secondary winding, the said housing being capable of forming a part of a welding machine or tool thereby decreasing the total weight of said welding machine or tool.

Other objects of this invention will become apparent by reference to the following detailed description taken in connection with the accompanying drawings, in which:

Fig. 1 is a view in perspective of a welding transformer embodying this invention, a portion thereof being broken away to more clearly show the parts thereof.

Fig. 2 is a top plan view of the embodiment disclosed in Fig. 1.

Fig. 3 is a cross sectional view taken on the line 3—3 of Fig. 2 looking in the direction indicated by the arrows.

Fig. 4 is a cross sectional view taken on the line 4—4 of Fig. 2 looking in the direction indicated by the arrows.

Figure 8:
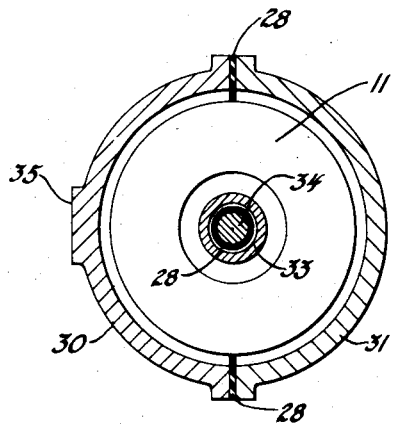
Fig. 8 is a vertical cross section taken on the line 8—8 of Fig. 6.

Referring particularly to the drawings wherein like numerals refer to like and corresponding parts throughout the several views, the transformer comprises a preferably laminated iron core 10 having a primary winding 11 therearound and a housing which serves as a secondary winding. The housing, in the case of the embodiment shown in Figs. 1, 2, 3 and 4, comprises two semicircular base sections 12 and 13 each having a half round vertically disposed current conducting member 14 and 15 respectively preferably integral therewith, two semi-cylindrical outer wall members 16 and 17 and two semi-circular cover sections 18 and 19. The entire transformer is assembled preferably as shown in Fig. 1 and various parts of the housing are insulated from each other as hereinafter described.

The transformer housing is preferably constructed of any non-ferrous material of high electric conductivity such as copper, brass, bronze, aluminum and the like. The various parts of the said transformer housing that are not insulated from each other may be secured together by such means as ordinary tap screws indicated at 20, while insulated tap screws or other suitable means may be employed to secure parts of the transformer housing in insulated relation to each other as indicated at 21. The semi-cylindrical outer wall members 16 and 17 are provided with outwardly disposed axial lugs 22 having apertures 23 therein to receive insulated bolts or other means, not shown, for securing said semi-cylindrical wall members in insulated assembled relation to each other.

Semi-cylindrical wall member 17 may be provided with an integral pad 24 to function as one secondary terminal of the transformer while the semi-circular cover section 19 may be provided with a similar integral pad 25 to function as the other secondary terminal. The primary input conductors 26 may be led from within the transformer housing at any suitable place such as through aperture 27 in base section 12.

To form a two turn secondary winding the transformer housing is assembled having some of the portions thereof in electrical contact with each other while other portions are assembled in insulated electrical relation to each other. Any insulation material known in the art of electrical construction may be used, the selection of such insulation being within the province of the designer and constructor of transformers embodying this invention. Insulation between the various parts of the transformer housing is shown in the drawings and designated by numeral 28 therein.

The dot and dash current flow line 29 will indicate the flow of secondary current through the various parts of the transformer housing which provides, in the embodiment shown in Figs. 1, 2, 3 and 4, a two turn secondary winding as follows:

The current enters the pad 24 of semi-cylindrical wall member 17 and flows therethrough into the semi-circular base section 12 and upward through the half round current conducting member 14 integral therewith. The current then flows from the top of the half round current conducting member 14 into the semi-circular cover section 18, through the said cover section 18 and into the other semi-cylindrical wall member 16. The current then flows through the semi-cylindrical wall member 16 into the other semi-circular base section 13, through the said semi-circular base section 13 and upward through the half round current conducting member 15 integral therewith. The current then flows into the other semi-circular cover section 19 from whence it leaves the transformer secondary through the pad 25 integral with the said cover section 19. The various transformer housing members are insulated from each other except where electrical contact is required as may be readily observed when following the current flow line 29 through Fig. 1 and by reference to Figs. 2, 3 and 4.

Figure 5:
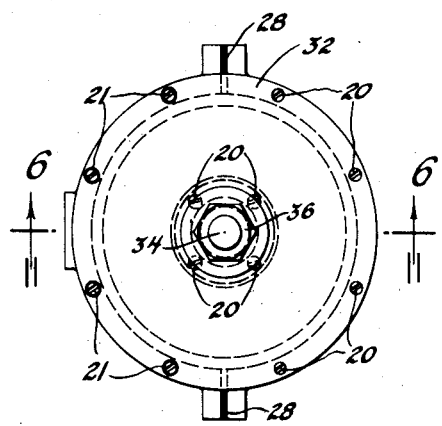
Fig. 5 is a top plan view of another embodiment of this invention.
Figure 7:
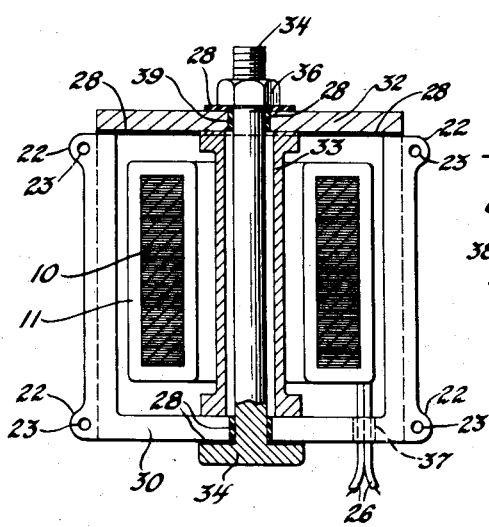
Fig. 7 is a cross sectional view taken on the line 7—7 of Fig. 6 looking in the direction indicated by the arrows.
Figure 6:
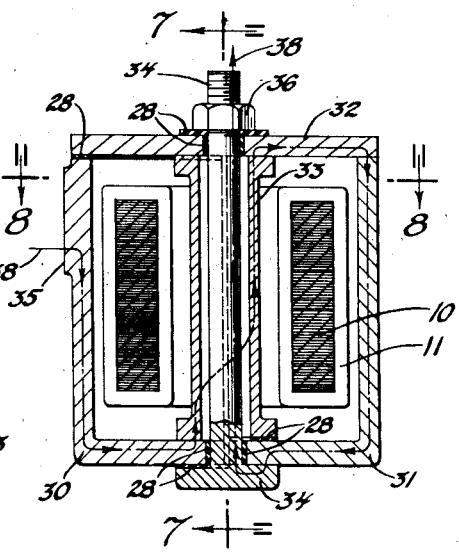
Fig. 6 is a cross sectional view taken on the line 6—6 of Fig. 5 looking in the direction indicated by the arrows.

Figs. 1, 2, 3 and 4 illustrate an embodiment of the invention in which the base including the vertically disposed current conducting member and the cover have been split into two sections each along one axis, and the cylindrical outer wall has been split into two sections along an axis 90 degrees to the first mentioned axis. It may be desirable in adapting this invention to welding machines or tools to use, for example, a one piece cover and to have one of the secondary terminals centrally disposed at the top of the transformer. This may be readily accomplished by arranging the transformer housing parts as disclosed in the embodiment illustrated in Figs. 5, 6, 7 and 8.

Referring now to Figs. 5, 6, 7 and 8 the transformer illustrated therein comprises a preferably laminated iron core 10 having a primary winding 11 therearound and a housing which serves as a secondary winding. The housing, in the case of the embodiment shown in Figs. 5, 6, 7 and 8, comprises two combined base and outer wall members 30 and 31, a circular cover member 32, a vertically disposed tubular central current conducting member 33 and a central solid current conducting member 34 disposed in spaced relation through said central tubular current conducting member.

Means for fastening the various portions of the transformer together in either electrical contact or insulated relation to each other are similar to those described for the embodiment shown in Figs. 1, 2, 3 and 4, like parts being designated by like numerals in Figs. 5, 6, 7 and 8. An aperture 39 is provided in cover member 32 through which the central solid current conducting member 34 protrudes, and arcuate notches, not shown, are provided at the center of the base portion of members 30 and 31 to accommodate said solid current conducting member.

The combined base and outer wall member 30 may be provided with an integral pad 35 to function as one secondary terminal of the transformer while the central solid current conducting member 34 functions as the other secondary terminal. The solid current conducting member 34 may be provided with a nut 36 threaded on its upper protruding end with which the same may be securely held in spaced relation within the tubular central current conducting member 33. The primary input conductors 26 may be led from within the transformer housing at any suitable place such as through the aperture 37 in combined base and outer wall member 30.

The dot and dash current flow line 38 will indicate the flow of the secondary current through the various parts of the transformer housing which provides, in the embodiment shown in Figs. 5, 6, 7 and 8, a two turn secondary winding as follows:

The current enters the pad 35 of the combined base and outer wall member 30 and flows therethrough into the hollow central current conducting member 33, and through said current conducting member 33 into the circular cover member 32. The current then flows from the circular cover member 32 into and through combined base and outer wall member 31 to a head provided on central solid current conducting member 34 from whence it travels through said central solid current conducting member 34 and leaves the transformer. The various transformer housing members are insulated from each other except where electrical contact is required as may be readily observed when following current flow line 38 through Fig. 6 and by reference to Figs. 5, 7 and 8.

The transformers disclosed herein may be provided with any cooling means known in the art such as casting air cooling fins on the outside secondary surfaces and/or circulating cooling water through passages provided therefor.

In adapting transformers constructed in accordance with this invention to welding tools or machines, the transformer may or may not be grounded, however, the transformer should be insulated from other parts of the welding tool or machine, the transformer, of course, being used where possible to take the place of a part of the welding machine or tool as, for example, the pedestal or other like inert parts. The invention, in its broad application, is adapted to use as a transformer for electric heating and drying equipment as well as for welding tools and machines.

In disclosing this invention only two embodiments have been shown and described and these embodiments have been in the form of welding transformers having a housing which also serves as a two turn secondary. Having thus disclosed means for utilizing the housing for a two turn secondary it becomes apparent to those skilled in the art how transformer housings may be divided into a multiplicity of parts and assembled into secondaries having even more than two turns therein. Although both embodiments of the invention disclosed herein have been cylindrical with flat tops and bottoms it is intended that, in practicing the invention, square, rectangular and even spherical transformers may be constructed within the scope hereof as defined by the appended claims.

I claim:

1. A welding transformer comprising an iron core, a primary winding around said core, a housing enclosing said core and primary winding having its cover and base including central current conducting member split along one axis and its wall member split along an axis 90 degrees to first mentioned axis, and means for securing said housing parts together in contact and in insulated relation with each other to form therewith a two turn secondary winding.

2. A welding transformer comprising an iron core, a primary winding around said core, a housing enclosing said core and primary winding having its cover and base including central current conducting member split along one axis and its wall member split along an axis 90 degrees to first mentioned axis, and means for securing said housing parts together in contact and in insulated relation with each other to form therewith a multiple turn secondary winding.

3. A welding transformer comprising an iron core, a primary winding around said core, a housing enclosing said core and primary winding having a cover, base including central current conducting member and wall member split into a plurality of pieces and assembled together in contact and insulated relation to each other to function as a two turn secondary winding and means for securing same in said assembled relation.

4. A welding transformer comprising an iron core, a primary winding around said core, a housing enclosing said core and primary winding having a cover, base including central current conducting member and wall member split into a plurality of pieces and assembled together in contact and insulated relation to each other to function as a multiple turn secondary winding and means for securing same in said assembled relation.

5. A welding transformer comprising an iron core, a primary winding around said core, a housing enclosing said core and primary winding having two combined base and outer wall members, a cover, a tubular current conducting member and a solid current conducting member within and in spaced relation to said tubular current conducting member, said parts of housing assembled together in contact and insulated relation to each other to function as a two turn secondary winding, and means for securing same in said assembled relation.

6. A welding transformer comprising an iron core, a primary winding around said core, a housing enclosing said core and primary winding having two combined base and outer wall members, a cover, a tubular current conducting member and a solid current conducting member within and in spaced relation to said tubular current conducting member, said parts of housing assembled together in contact and insulated relation to each other to function as a multiple turn secondary winding, and means for securing same in said assembled relation.

7. In a welding transformer, a housing consisting of a plurality of parts and means for securing said parts together in contact and insulated relation to each other so as to permit said housing to function as a multiple turn secondary winding.

8. In a welding machine having a transformer as a part thereof, a transformer comprising an iron core, a primary winding around said iron core, a housing around said iron core and primary winding consisting of a plurality of parts secured together in contact and insulated relation to each other to permit the said housing to function both as a multiple turn secondary winding and a portion of said welding machine.

9. In a welding machine having a transformer as a part thereof, a transformer having an iron core, primary winding and a housing, the said transformer housing consisting of a plurality of parts secured together in contact and insulated relation to each other in such a manner as to permit said housing to function as a multiple turn secondary.

PETER W. FASSLER.